United States Patent
Ahmed et al.

(10) Patent No.: US 12,312,250 B1
(45) Date of Patent: May 27, 2025

(54) SYNTHESIS OF ZINC OXIDE NANOPARTICLES USING L-TRYPTOPHAN AS A FUEL

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/931,219

(22) Filed: Oct. 30, 2024

(51) Int. Cl.
C01G 9/02 (2006.01)

(52) U.S. Cl.
CPC ............ *C01G 9/02* (2013.01); *C01P 2002/01* (2013.01); *C01P 2002/60* (2013.01); *C01P 2002/72* (2013.01); *C01P 2004/03* (2013.01); *C01P 2004/04* (2013.01); *C01P 2004/64* (2013.01); *C01P 2006/12* (2013.01); *C01P 2006/14* (2013.01); *C01P 2006/16* (2013.01); *C01P 2006/40* (2013.01)

(58) Field of Classification Search
CPC ........................................................ C01G 9/02
See application file for complete search history.

(56) References Cited

U.S. PATENT DOCUMENTS

| 5,114,702 A | 5/1992 | Pederson et al. |
| 2019/0062225 A1 | 2/2019 | Chan et al. |

FOREIGN PATENT DOCUMENTS

| CN | 109946348 A | 6/2019 |
| CN | 111517361 A | 8/2020 |
| CN | 117023626 A | 11/2023 |

OTHER PUBLICATIONS

Navaladian Subramanian, et al., "An Amino Acid-Based Swift Synthesis of Zinc Oxide Nanostructures", RSC Advances, 2014, 4, Issue 9, 3 Pages.

*Primary Examiner* — James A Fiorito
(74) *Attorney, Agent, or Firm* — Oblon, McClelland, Maier & Neustadt, L.L.P.

(57) ABSTRACT

A method of synthesizing zinc oxide nanoparticles includes mixing an aqueous solution of a zinc precursor and an aqueous solution of L-tryptophan to form a reaction mixture and heating the reaction mixture to a temperature of at least 100° C. to produce a dry powder. The method further includes calcining the dry powder to obtain the zinc oxide nanoparticles. The zinc oxide nanoparticles have an average particle size of 155 nm or less. Further, the zinc oxide nanoparticles are substantially spherical and include mesopores with a total pore volume of 0.1 to 0.5 cm$^3$/g.

20 Claims, 6 Drawing Sheets

SYNTHESIS OF ZINC OXIDE NANOPARTICLES USING L-TRYPTOPHAN AS A FUEL

BACKGROUND

Technical Field

The present disclosure is directed to a method for the synthesis of nanoparticles, more particularly, a method for the synthesis of zinc oxide nanoparticles via fuel combustion method using L-tryptophan as a fuel, and the nanoparticles formed by the method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Nanotechnology has many applications including, but not limited to, energy production, environmental purification, food production, biomedicine, and electronics. These applications span a wide range of industries, including pharmaceuticals, cosmetics, textiles, opto-electronics, and agriculture. Nanoparticles may behave in contrast to their bulk counterparts and may exhibit superior properties, such as high stability, a high surface area with respect to volume ratio, tunable optical properties, and other size-dependent properties such as reactivity, melting point, and electrical conductivity. Nanoparticles are, therefore, attractive for use in areas such as surface coating, optical communications, sensors, and semiconductors due to their adjustable properties. Zinc oxide nanoparticles are particularly of interest for these applications due to their high chemical stability, wide radiation absorption range, and excellent photostability. As a semiconductor with a wide band gap, zinc oxide nanoparticles exhibit remarkable characteristics, including high bond energy, photoluminescence, piezoelectricity, and thermal stability, making them promising additions to a variety of applications in electronics, optoelectronics, sensing, solar cells, and laser technology.

Synthesizing nanoparticles requires controlled synthesis such as such as sol-gel, hydrothermal, solvothermal, and chemical vapor deposition (CVD). However, these synthesis techniques pose challenges due to high costs, complex procedures, and the use of toxic chemicals, rendering these methods inefficient and unsustainable. Altering synthesis methods of nanoparticles, however, can result in inconsistent nanoparticle sizing and morphology. Recently, there has been a growing focus on the synthesis of nanoparticles through combustion. Combustion synthesis has emerged as an alternative for nanoparticle production due to its comparatively low energy requirements and rapid production of high-purity nanoparticles Combustion synthesis is an adaptable synthesis route for the preparation of nanoparticles. During synthesis, reaction occurs between the fuel and oxidizer by an exothermic reaction. The fuel is used to burn the oxidizer completely to form the desired product and facilitate combustion to occur. The type of fuel utilized may influence the morphology of the synthesized nanoparticles. Further, the amount of gas produced during synthesis may affect the particle size and agglomeration of the nanoparticles. Thus, there is a need to identify a method of synthesizing nanoparticles in which a consistent particle size and morphology is achieved to optimize the desired size-dependent characteristics needed for the nanotechnology at hand. Additionally, most combustion synthesis methods rely on synthetic fuels or reducing agents that may be costly, hazardous, or environmentally detrimental, creating a need for environmentally friendly, non-toxic fuels for the synthesis of nanoparticles by combustion.

Accordingly, one objective of the present disclosure is a method for developing zinc oxide nanoparticles using L-tryptophan as a fuel. This method may circumvent the aforementioned stated drawbacks like complex synthesis methods, high energy consumption, inconsistent nanoparticle size and morphology, and the need for toxic solvents or complex equipment.

SUMMARY

In an exemplary embodiment, a method of synthesizing zinc oxide nanoparticles is disclosed. The method comprises mixing an aqueous solution of a zinc precursor and an aqueous solution of L-tryptophan to form a reaction mixture. The method comprises heating the reaction mixture to a temperature of at least 100 degrees Celsius (° C.) to produce a dry powder. The method further comprises calcining the dry powder to generate the zinc oxide nanoparticles. The zinc oxide nanoparticles have an average particle size of 155 nanometer (nm) or less. Further, the zinc oxide nanoparticles are substantially spherical and include mesopores with a total pore volume of 0.1 to 0.5 cubic centimeters per gram ($cm^3/g$).

In some embodiments, the method comprises calcining the obtained dry powder at a temperature of 450 to 850° C. for 1 to 5 hours (h).

In some embodiments, the zinc oxide nanoparticles have an average particle diameter of 100 nm or less.

In some embodiments, the mesopores have an average pore diameter of 9 nm or less.

In some embodiments, the zinc precursor is at least one selected from the group consisting of zinc nitrate hydrate, a zinc chloride hydrate, a zinc sulfate hydrate, and a zinc acetate hydrate.

In some embodiments, the zinc precursor is zinc nitrate hexahydrate ($Zn(NO_3)_2 \cdot 6H_2O$).

In some embodiments, the zinc oxide nanoparticles have an average particle diameter of 85 nm or less.

In some embodiments, the zinc oxide nanoparticles are substantially spherical and comprise mesopores having a total pore volume of 0.25 to 0.3 $cm^3/g$.

In some embodiments, the zinc oxide nanoparticles are substantially spherical and comprise mesopores having a total pore volume of 0.2732 $cm^3/g$.

In some embodiments, the method comprises calcining the dry powder at a temperature of 650° C. for 3 h.

In some embodiments, the mesopores have an average pore diameter of 8.23 nm.

In some embodiments, the method comprises heating the reaction mixture at a temperature of 120° C. to obtain the dry powder.

In some embodiments, the zinc oxide nanoparticles have an average crystallite size of 50 to 70 nm.

In some embodiments, the zinc oxide nanoparticles have an average crystallite size of 57.80 nm.

In some embodiments, the zinc oxide nanoparticles have a Brunauer-Emmett-Teller (BET) surface area of 70 square meters per gram ($m^2/g$) or less.

In some embodiments, the zinc oxide nanoparticles have a BET surface area of 67.25 m²/g.

In some embodiments, the reaction mixture has a weight ratio of L-tryptophan to zinc precursor of 1:1 to 1:10.

In some embodiments, the reaction mixture has a weight ratio of L-tryptophan to zinc precursor of 1:7 to 1:8.

In some embodiments, the zinc oxide nanoparticles have an average particle diameter of 82.93 nm.

In some embodiments, the method further comprises forming a layer of the zinc oxide nanoparticles on a substrate or a semiconductor.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
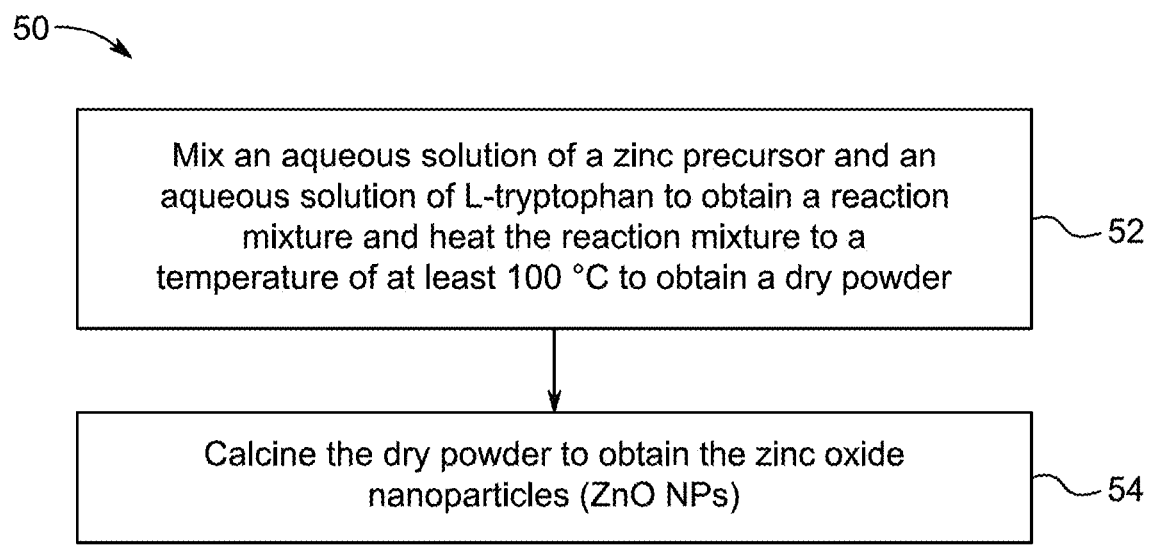
FIG. 1 is a method flowchart for synthesizing zinc oxide nanoparticles, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term "compound" refers to a chemical entity, regardless of its phase-solid, liquid, or gaseous—as well as its state-crude mixture, purified, or isolated.

As used herein, the term "particle" refers to a small object that acts as a whole unit with regard to its transport and properties.

As used herein, the terms "particle diameter" may be thought of as the length or longest dimension of a single particle. The greatest distance that can be measured from one point on a shape through its center to a point directly across from it is referred to as the "diameter" for a circle, oval, ellipse, and multilobe.

As used herein, the terms "particle size" may be thought of as the length or longest dimension of an agglomerate of particles. Agglomeration occurs when attractive forces between particles are stronger than repulsive forces. Smaller particles are more likely to agglomerate because they have a higher surface area and molecular gravity.

As used herein, the term "porosity" refers to a measure of the void (e.g., "pore") or vacant spaces within a material. Porosity is represented as a fraction of the volume of voids over the total volume, between 0 and 1, or as a percentage between 0% and 100%.

As used herein, the term "pore size" may be thought of as the length or longest dimension of a void (e.g., "pore") opening. The International Union of Pure and Applied Chemistry (IUPAC) classifies pore sizes into three categories. Macropores are pores with a length or longest dimension larger than 50 nm, mesopores are pores with a length or longest dimension between 2 and 50 nm, and micropores are pores with a length or longest dimension of less than 2 nm.

As used herein, "nanoparticles" refers to particles having a particle size of less than 200 nm within the scope of the present disclosure.

As used herein, the term "room temperature" refers to a temperature range of 25° C.±3° C. in the present disclosure.

As used herein, the term "calcination" refers to a thermal treatment of a solid chemical compound whereby the compound is raised to high temperature without melting under restricted supply of ambient oxygen, to control the size, crystallinity, and optical properties of nanoparticles.

As used herein, a "crystallite" refers to a single crystal within a larger particle that has atoms in a highly ordered arrangement. A crystallite is the smallest individual unit that a particle is made up of, with sizes generally ranging from nanometers to micrometers.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. Isotopically labeled compounds of the disclosure may generally be prepared by conventional techniques known to those skilled in the art or by processes analogous to those described herein, using an appropriate isotopically labeled reagent in place of the non-labeled reagent otherwise employed.

Aspects of the present disclosure are directed to a method for synthesizing zinc oxide nanoparticles through a combustion process utilizing L-tryptophan as a fuel. The use of L-tryptophan as a fuel in the combustion synthesis of zinc oxide nanoparticles reduces the environmental impact and cost associated with the process. The method facilitates the rapid production of zinc oxide nanoparticles with controlled size and morphology, without the requirement for complex equipment or harsh chemicals, making it more accessible for broader applications.

FIG. 1 illustrates a flow chart of a method 50 for synthesizing zinc oxide nanoparticles. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 comprises mixing an aqueous solution of a zinc precursor and an aqueous solution of L-tryptophan to obtain a reaction mixture. The mixing may be carried out manually or with a stirrer. In one embodiment, the mixing comprises mixing the aqueous solution of the zinc precursor and the aqueous solution of L-tryptophan at a speed of 100 to 500 rotations per minute (rpm) to obtain the reaction mixture. In some embodiments, the speed is 150 to 450 rpm, preferably 200 to 400 rpm, preferably 200 to 350 rpm, preferably 200 to 300 rpm, preferably 200 to 250 rpm, most preferably 200 rpm. In one embodiment, the zinc precursor may be selected from a zinc citrate, a zinc iodide, zinc perchlorate, zinc phosphate, zinc triflate, zinc bis(trifluoromethanesulfonyl)imide, zinc tetrafluoroborate, zinc bromide, a hydrate thereof, or mixtures thereof. In alternate embodiments, the zinc precursor is selected from a zinc nitrate hydrate, a zinc chloride hydrate, a zinc sulfate hydrate, and a zinc acetate hydrate. Preferably, the zinc precursor is in a nitrate form because the nitrate form has greater water solubility, thereby achieving greater homogenization during synthesis of the reaction mixture. In a preferred embodiment, the zinc precursor is zinc nitrate hexahydrate ($Zn(NO_3)_2 \cdot 6H_2O$).

L-tryptophan is an essential amino acid having a chemical formula of $C_{11}H_{12}N_2O_2$. L-tryptophan is a polar molecule that has an indole side chain which may enable the formation of self-assembled structures. During the process of molecular self-assembly, individual molecules (monomers) undergo independent organization via a number of non-covalent interactions, including hydrogen bonding, electrostatic attraction, and van der Waals forces, thereby forming thermodynamically stable, ordered, hierarchical nanostructures. Specifically, the self-assembly of proteins may play a role in the formation of several nanostructures. L-tryptophan may further act as both a reducing and stabilizing agent in the synthesis of nanoparticles, meaning it helps to reduce metal ions to their metallic state while also preventing the newly formed nanoparticles from clumping together, allowing for the creation of stable nanostructures. In a preferred embodiment, L-tryptophan functions as a fuel for the combustion method. When heated, L-tryptophan combusts releasing heat. This exothermic process rapidly decomposes the zinc precursor and facilitates the formation of the zinc oxide nanoparticles. During combustion, L-tryptophan breaks down and reacts with the oxygen provided by the zinc precursor, producing gaseous byproducts. The remaining solid product is zinc oxide (ZnO), formed as a result of the combustion reaction.

The reaction mixture is heated to a temperature of at least 100° C. to obtain a dry powder. In some embodiments, the reaction mixture is heated to a temperature of 101° C., preferably 102° C., preferably 103° C., preferably 104° C., preferably 105° C., preferably 106° C., preferably 107° C., preferably 108° C., preferably 109° C., preferably 110° C., preferably 111° C., preferably 112° C., preferably 113° C., preferably 114° C., preferably 115° C., preferably 116° C., preferably 117° C., preferably 118° C., preferably 119° C., most preferably 120° C. In a preferred embodiment, the reaction mixture is heated to a temperature of 120° C. to obtain a dry powder. The heating can be done by using heating appliances such as hot plates, muffle furnace, tube furnace, heating mantles ovens, microwaves, autoclaves, tapes, oil baths, salt baths, sand baths, air baths, hot-tube furnaces, hot-air guns, and other methods known in the art. An important aspect of the method for forming the zinc oxide nanoparticles relates to the concurrent mixing and heating of the zinc precursor and the fuel. Concurrently mixing and heating at a temperature above the boiling point of the solvent (e.g., an aqueous matrix) forms a dried product that undergoes calcining smoothly and consistently to form a product having a uniform and consistent morphological and crystalline feature.

In some embodiments, the reaction mixture has a weight ratio of L-tryptophan to zinc precursor of 1:1 to 1:10, preferably 1:2 to 1:9, preferably 1:3 to 1:8, preferably 1:4 to 1:8, preferably 1:5 to 1:8, preferably 1:6 to 1:8, most preferably 1:7 to 1:8. In alternative embodiments, the reaction mixture has a weight ratio of L-tryptophan to zinc precursor of 1:7.1 to 1:7.9, preferably 1:7.2 to 1:7.8, preferably 1:7.3 to 1:7.7, preferably 1:7.4 to 1:7.7, preferably 1:7.5 to 1:7.7, preferably 1:7.6 to 1:7.7, most preferably 1:7.61. In a preferred embodiment, the reaction mixture has a weight ratio of L-tryptophan to zinc precursor of 1:7.61.

At step 54, the method 50 comprises calcining the dry powder to obtain the zinc oxide nanoparticles. The calcination is carried out by heating it to a high temperature, under a restricted supply of ambient oxygen, to control the size, crystallinity, and optical properties of the zinc oxide nanoparticles. In some embodiments the calcining is performed by a furnace, however, any known method in the art may be used. The heating rate utilized during calcination can influence the final morphology of the zinc oxide nanoparticles, such as the shape and size distribution. A slower heating rate allows for more controlled crystal growth, potentially leading to smaller and more uniform nanoparticles. In contrast, rapid heating can cause particles to agglomerate. In one embodiment, the calcining comprises calcining the dry powder at a heating rate of 1 to 15 degrees Celsius per minute (° C./min), preferably 1 to 14° C./min, preferably 1 to 13° C./min, preferably 1 to 12° C./min, preferably 1 to 11° C./min, preferably 1 to 10° C./min, preferably 1 to 9° C./min, preferably 1 to 8° C./min, preferably 1 to 7° C./min, preferably 1 to 6° C./min, preferably 1 to 5° C./min, preferably 1 to 4° C./min, preferably 1 to 3° C./min, preferably 1 to 2° C./min, most preferably 1° C./min. In one embodiment, the calcining comprises calcining the dry powder at a temperature of 450 to 850° C. for 1 to 5 h. In some embodiments, the calcining comprises calcining the dry powder at a temperature of 460 to 840° C., preferably 470 to 830° C., preferably 480 to 820° C., preferably 490 to 810° C., preferably 500 to 800° C., preferably 510 to 790° C., preferably 520 to 780° C., preferably 530 to 770° C., preferably 540 to 760° C., preferably 550 to 750° C., preferably 560 to 740° C., preferably 570 to 730° C., preferably 580 to 720° C., preferably 590 to 710° C., preferably 600 to 700° C., preferably 610 to 690° C., preferably 620 to 680° C., preferably 630 to 670° C., most preferably 640 to 660° C. In some embodiments, the calcining comprises calcining the dry powder for 2 to 4 h, most preferably 3 h. In a preferred embodiment, the powder is calcined at a temperature of 650° C. for 3 h.

In some embodiments, the zinc oxide nanoparticles have an average crystallite size of 50 to 70 nm, preferably 51 to 69 nm, preferably 52 to 68 nm, preferably 53 to 67 nm, preferably 54 to 66 nm, preferably 55 to 65 nm. In a preferred embodiment, the zinc oxide nanoparticles have an average crystallite size of 57.80 nm. In some embodiments, the zinc oxide nanoparticles have an average particle size of 155 nm or less, preferably 154 nm or less, preferably 153 nm or less, preferably 152 nm or less, most preferably 151.18 nm or less. In some embodiments, the zinc oxide nanoparticles have an average particle diameter of 100 nm or less, preferably 95 nm or less, preferably 90 nm or less, preferably 85 nm or less. In a preferred embodiment, the zinc oxide nanoparticles have an average particle diameter of 82.93 nm.

An important aspect of the method is that the zinc oxide nanoparticles produced have a uniform and consistent morphological and crystalline feature. D50 and D90 are parameters utilized to further describe the particle diameter of a powder, particularly the distribution of the particle diameters of the produced nanoparticles. The D90 is the particle diameter at which 90% of the particles are smaller and 10% are larger, while the D50 is the particle diameter at which 50% of the particles are smaller and 50% are larger. In one embodiment, the D90 of the zinc oxide nanoparticles is 100 nm or less, preferably 99 nm or less, preferably 98 nm or less, preferably 97 nm or less, preferably 96 nm or less, preferably 95 nm or less, preferably 94 nm or less, preferably 93 nm or less, preferably 92 nm or less, preferably 91 nm or less, preferably 90 nm or less, preferably 89 nm or less, preferably 88 nm or less, preferably 86 nm or less, preferably 85 nm or less, preferably 84 nm or less, most preferably 83 nm or less. In one embodiment, the D50 of the zinc oxide nanoparticles is 160 nm or less, preferably 159 nm or less, preferably 158 nm or less, preferably 157 nm or less, preferably 156 nm or less, preferably 155 nm or less, preferably 154 nm or less, preferably 153 nm or less, most preferably 152 nm or less.

The Brunauer-Emmet-Teller (BET) hypothesis is a method for determining the specific surface area of a material based on the physical adsorption of gas molecules on a solid surface. Specific surface area is a property of solids, which is the total surface area of a material per unit of mass, solid or bulk volume, or cross-sectional area. In some embodiments, BET surface area is measured by gas adsorption analysis, preferably $N_2$ adsorption analysis (e.g., $N_2$ adsorption isotherms). In a preferred embodiment, the zinc oxide nanoparticles are substantially spherical. In some embodiments, the zinc oxide nanoparticles have a BET surface area of 75 $m^2/g$ or less, preferably 74 $m^2/g$ or less, preferably 73 $m^2/g$ or less, preferably 72 $m^2/g$ or less, preferably 71 $m^2/g$ or less, preferably 70 $m^2/g$ or less, preferably 69 $m^2/g$ or less, most preferably 68 $m^2/g$ or less. In a preferred embodiment, the zinc oxide nanoparticles have a BET surface area of 67.25 $m^2/g$.

In some embodiments, the zinc oxide nanoparticles may exist in various morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

In some embodiments, the zinc oxide nanoparticles are porous. Pore size may be determined by any known method including, but not limited to, gas adsorption (e.g. $N_2$ adsorption), mercury intrusion porosimetry, and imaging techniques such as scanning electron microscopy (SEM), and X-ray computed tomography (XRCT). In some embodiments, pore diameter and pore volume are measured by gas adsorption analysis, preferably $N_2$ adsorption analysis (e.g., $N_2$ adsorption isotherms). In some embodiments, the zinc oxide nanoparticles comprise mesopores. In one embodiment, the mesopores have an average pore diameter of 15 nm or less, preferably 14 nm or less, preferably 13 nm or less, preferably 12 nm or less, preferably 11 nm or less, preferably 10 nm or less, most preferably 9 nm or less. In a preferred embodiment, the mesopores have an average pore diameter of 8.23 nm. In some embodiments, the zinc oxide nanoparticles comprise mesopores having a total pore volume of 0.1 to 0.5 $cm^3/g$. In some embodiments, the mesopores have a total pore volume of 0.11 to 0.49 $cm^3/g$, preferably 0.12 to 0.48 $cm^3/g$, preferably 0.13 to 0.47 $cm^3/g$, preferably 0.14 to 0.46 $cm^3/g$, preferably 0.15 to 0.45 $cm^3/g$, preferably 0.16 to 0.44 $cm^3/g$, preferably 0.17 to 0.43 $cm^3/g$, preferably 0.18 to 0.42 $cm^3/g$, preferably 0.19 to 0.41 $cm^3/g$, preferably 0.20 to 0.40 $cm^3/g$, preferably 0.21 to 0.39 $cm^3/g$, preferably 0.22 to 0.38 $cm^3/g$, preferably 0.23 to 0.37 $cm^3/g$, preferably 0.24 to 0.36 $cm^3/g$, preferably 0.25 to 0.35 $cm^3/g$, preferably 0.26 to 0.34 $cm^3/g$, preferably 0.27 to 0.33 $cm^3/g$, preferably 0.27 to 0.32 $cm^3/g$, preferably 0.27 to 0.31 $cm^3/g$, preferably 0.27 to 0.30 $cm^3/g$, preferably 0.27 to 0.29 $cm^3/g$, most preferably 0.27 to 0.28 $cm^3/g$. In a preferred embodiment, the zinc oxide nanoparticles are substantially spherical and comprise mesopores having a total pore volume of 0.2732 $cm^3/g$.

In some embodiments, the method 50 further comprises forming a layer of the zinc oxide nanoparticles on a substrate or a semiconductor. The substrate may be conductive carbon substrate, graphite substrate, an aluminum foam, a nickel foam, a titanium foam, a titanium alloy foam, an aluminum alloy foam, a magnesium alloy foam, a nickel alloy foam, or a steel foam. In some embodiments, layer of the zinc oxide nanoparticles may be formed on the surface of the substrate/semiconductor using one of the techniques like the drop-casting method, spray coating, spin coating, dip coating, physical vapor deposition (PVD), aerosol-assisted chemical vapor deposition (AACVD), or molecular beam epitaxy (MBE). The coating of zinc oxide nanoparticles on the substrate or semiconductor forms an electrode which serve as efficient electrocatalysts for electrocatalytic reactions (hydrogen and oxygen evolution). The porous structure exposes more active sites on a given electrode and promotes electrolyte penetration and transfer.

Additionally, the zinc oxide nanoparticles, with their controlled size, high surface area, and mesoporous nature, are particularly well-suited for applications in catalysis, where they can serve as efficient catalysts or catalyst supports due to their large surface area and active sites. In sensors, their unique optical and electronic properties make them ideal for use in gas sensors, biosensors, and other environmental monitoring devices. Furthermore, in optoelectronics, zinc oxide nanoparticles can be used in light-emitting diodes, photovoltaic cells, and display technologies due to their excellent optical transparency and wide bandgap. Additionally, the high surface area and porous nature of nanoparticles make them suitable for applications in adsorption and drug delivery systems, where controlled release and high adsorption capacities are essential.

EXAMPLES

The following examples demonstrate the preparation of zinc oxide nanoparticles via fuel combustion method. The examples are provided solely for illustration and are not to be construed as limitations of the present disclosure, as many variations thereof are possible without departing from the spirit and scope of the present disclosure.

Example 1: Synthesis of Zinc Oxide Nanoparticles

All chemicals used in this study were purchased from Sigma-Aldrich Chemical Company. Zinc (II) nitrate hexahydrate ($Zn(NO_3)_2 \cdot 6H_2O$) and L-tryptophan ($C_{11}H_{12}N_2O_2$) were employed as the primary reagents in the synthesis of zinc oxide nanoparticles.

Figure 2:
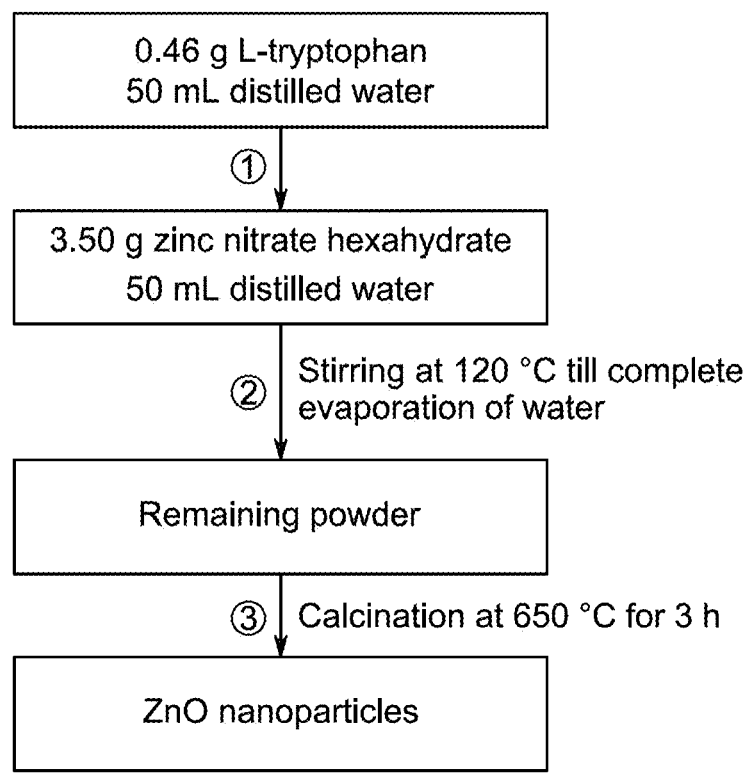
FIG. 2 shows experimental steps for the preparation of zinc oxide nanoparticles, according to certain embodiments.

To synthesize zinc oxide nanoparticles, 3.50 grams (g) of $Zn(NO_3)_2 \cdot 6H_2O$ was dissolved in 50 mL of distilled water. In a separate beaker, 0.46 g of L-tryptophan was dissolved in 50 milliliters (mL) of distilled water. The L-tryptophan solution was then added to the zinc nitrate solution with continuous stirring at 120° C. until the water completely evaporated. The resulting powder was subsequently calcined at 650° C. for 3 hours (h) to produce zinc oxide nanoparticles, as shown in FIG. 2.

In this reaction, $Zn(NO_3)_2 \cdot 6H_2O$ serves as the zinc precursor, while L-tryptophan functions as a fuel. When heated, L-tryptophan combusts releasing heat. This exothermic process rapidly decomposes the zinc precursor and facilitates the formation of zinc oxide nanoparticles. During combustion, L-tryptophan breaks down and reacts with the oxygen provided by the nitrates in the zinc nitrate hexahydrate, producing gaseous byproducts such as nitrogen ($N_2$), carbon dioxide ($CO_2$), and water vapor ($H_2O$). The remaining solid product is zinc oxide (ZnO), formed as a result of the combustion reaction. The corresponding chemical equation is shown in Eq. 1.

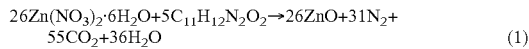

$$26Zn(NO_3)_2 \cdot 6H_2O + 5C_{11}H_{12}N_2O_2 \rightarrow 26ZnO + 31N_2 + 55CO_2 + 36H_2O \quad (1)$$

Example 2: X-Ray Diffraction (XRD) Analysis

Figure 3:
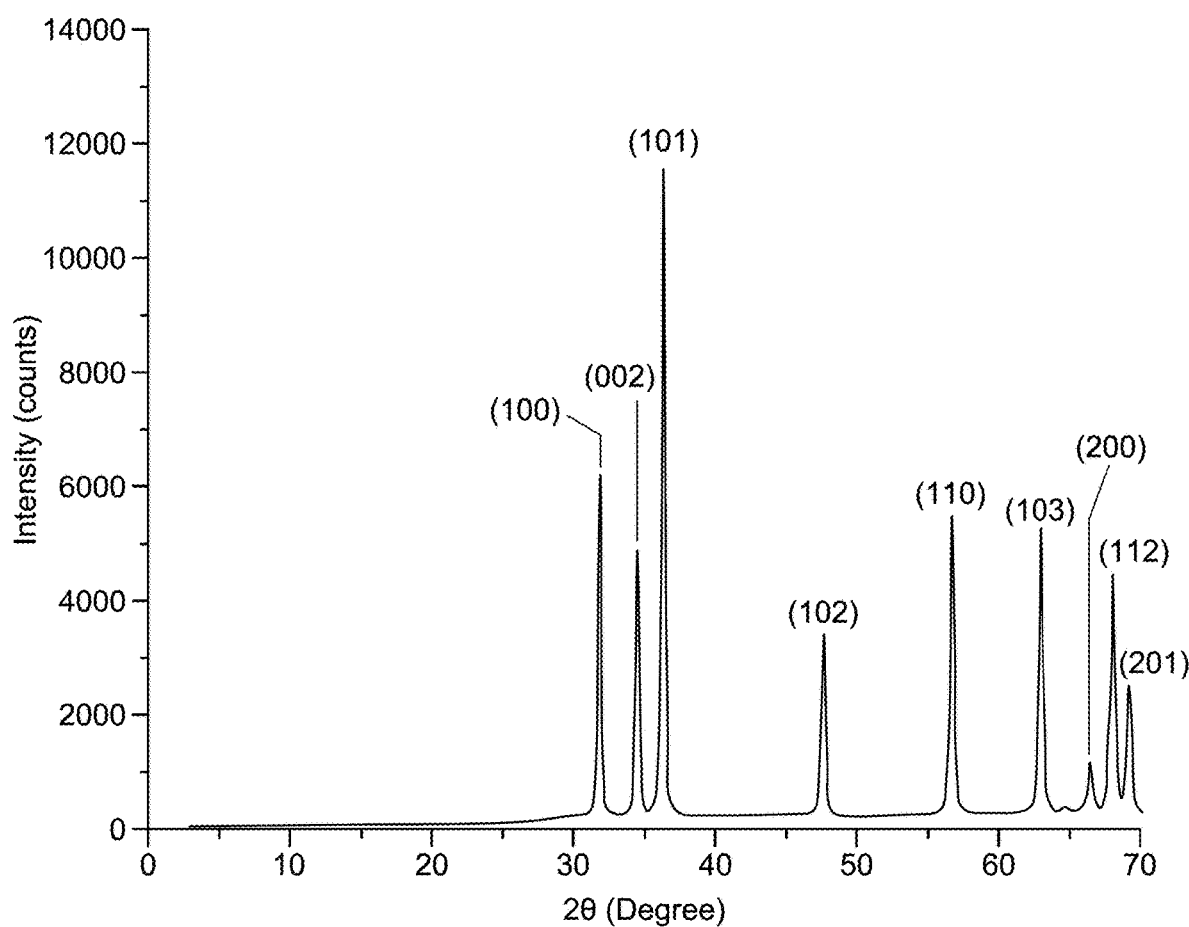
FIG. 3 shows an X-ray diffraction (XRD) pattern for the zinc oxide nanoparticles, according to certain embodiment.

FIG. 3 presents an X-ray diffraction (XRD) pattern of zinc oxide nanoparticles showing characteristic peaks at angles 31.66°, 34.43°, 36.26°, 47.56°, 56.64°, 62.80°, 66.38°, 68.04°, and 69.14°, corresponding to the Miller indices (100), (002), (101), (102), (110), (103), (200), (112), and (201), respectively. The zinc oxide nanoparticles exhibit a hexagonal crystal system as identified by the JCPDS card number 01-078-3325. The average crystallite size of the zinc oxide nanoparticle sample is approximately 57.80 nanometer (nm).

Example 3: Field Emission Scanning Electron Microscopy (FE-SEM) Analysis

Figure 4:
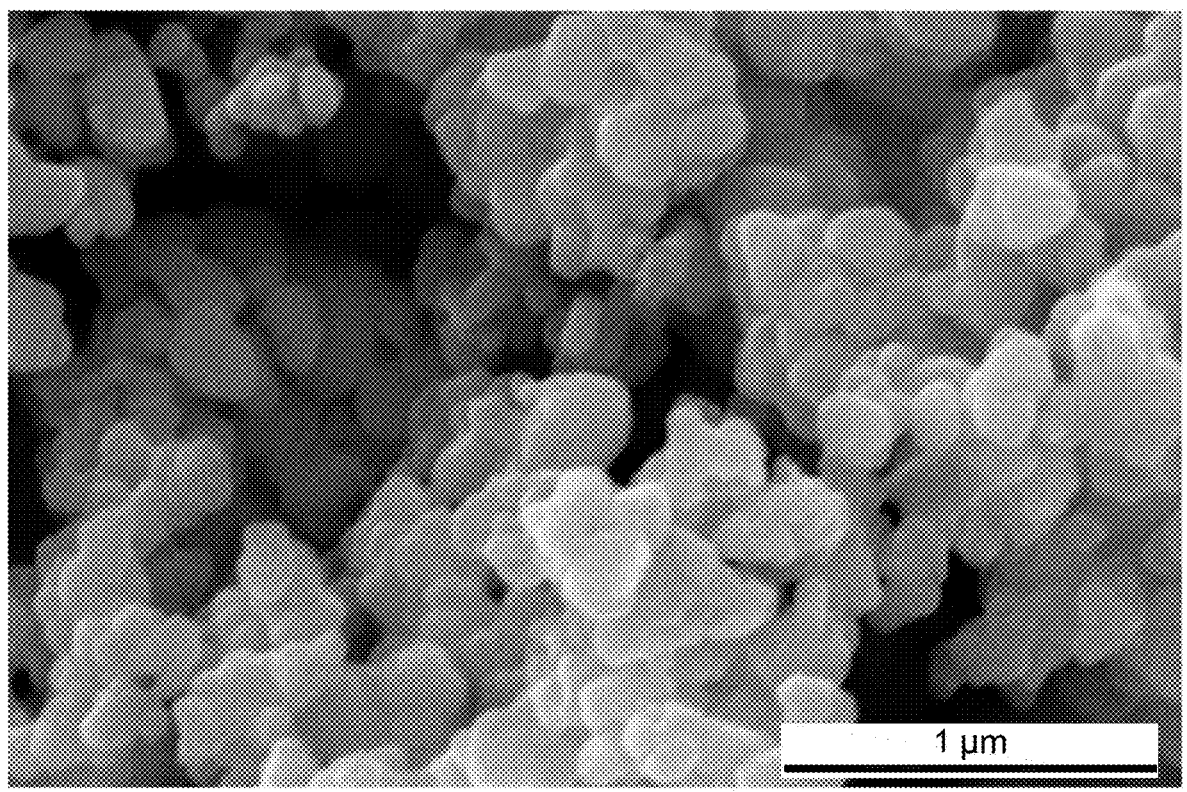
FIG. 4 shows a field emission scanning electron microscopy (FE-SEM) image of the zinc oxide nanoparticles, according to certain embodiments.

FIG. 4 shows a FESEM image of zinc oxide nanoparticles, revealing their morphology and particle distribution. The particles predominantly have a spherical shape, with some degree of agglomeration observed. The particles also exhibit a relatively uniform size distribution, with an average particle size of approximately 151.18 nm. This spherical morphology and consistent particle size are advantageous for applications in catalysis, sensors, and environmental remediation, where surface properties and uniformity are critical.

Example 4: High-Resolution Transmission Electron Microscopy (HRTEM) Analysis

Figure 5:
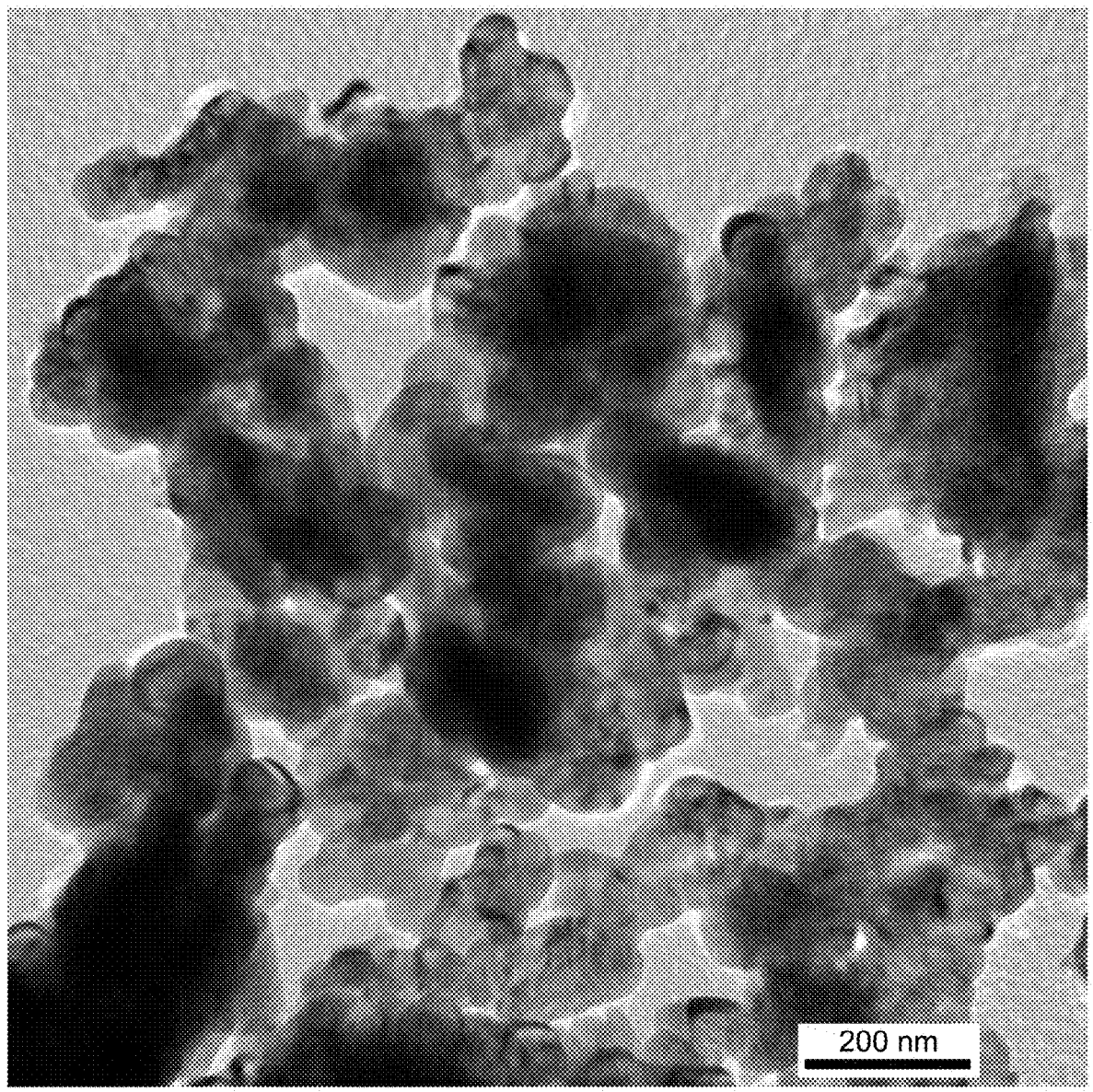
FIG. 5 depicts a high-resolution transmission electron microscopy (HR-TEM) image for zinc oxide nanoparticles, according to certain embodiments.

FIG. 5 displays an HRTEM image of zinc oxide nanoparticles, providing detailed insight into their morphology and size distribution. The image shows that the zinc oxide nanoparticles have a nearly spherical shape with some degree of agglomeration, forming clusters. The nanoparticles exhibit a relatively uniform distribution, with an average particle diameter of approximately 82.93 nm. This nanoscale size and spherical shape are beneficial for various applications, such as catalysis, optoelectronics, and biomedical uses, where particle uniformity and surface characteristics play a significant role in enhancing performance and functionality.

Example 5: Brunauer-Emmett-Teller (BET) Analysis

Figure 6:
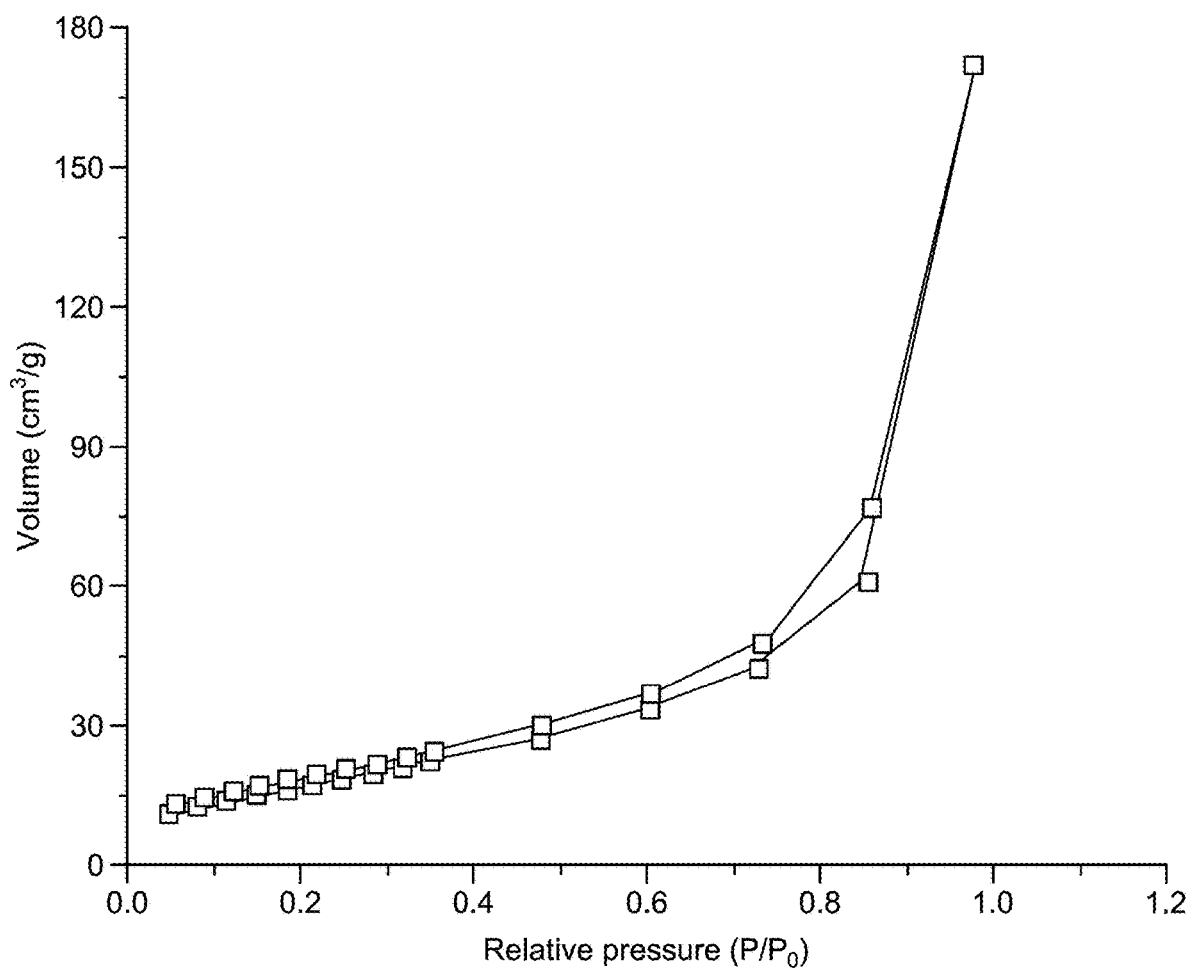
FIG. 6 exhibits a nitrogen ($N_2$) adsorption/desorption isotherm of zinc oxide nanoparticles, according to certain embodiments.

FIG. 6 presents the nitrogen adsorption/desorption isotherm of Zinc oxide nanoparticles, which demonstrates the volume of nitrogen adsorbed as a function of relative pressure. The isotherm exhibits a characteristic hysteresis loop, indicating the presence of mesoporous structures within the zinc oxide nanoparticles. Table 1 provides the surface textural properties of the zinc oxide nanoparticles, showing a BET surface area of 67.25 m²/g, a total pore volume of 0.2732 cm³/g, and an average pore diameter of 8.23 nm. The presence of mesopores is further supported by the average pore size, which is greater than 2 nm but less than 50 nm, confirming that the zinc oxide nanoparticles predominantly contain mesoporous structures, advantageous for applications that require high surface area and controlled porosity, such as catalysis, adsorption, and drug delivery systems.

TABLE 1

| Surface properties of zinc oxide nanoparticles | | |
|---|---|---|
| BET surface area (m²/g) | Total pore volume (cm³/g) | Mean pore diameter (nm) |
| 67.25 | 0.2732 | 8.23 |

Numerous modifications and variations of the present disclosure are possible in light of the above teachings. It is, therefore, to be understood that within the scope of the appended claims, the present disclosure may be practiced otherwise than as specifically described herein.

The invention claimed is:

1. A method for synthesizing zinc oxide nanoparticles, comprising:
   mixing an aqueous solution of a zinc precursor and an aqueous solution of L-tryptophan to obtain a reaction mixture while heating the reaction mixture at a temperature of at least 100° C. to obtain a dry powder, and calcining the dry powder at a temperature of at least 650° C. to obtain the zinc oxide nanoparticles,
   wherein the zinc oxide nanoparticles have an average particle size of 155 nm or less, and
   wherein the zinc oxide nanoparticles are substantially spherical and comprise mesopores having a total pore volume of 0.1 to 0.5 cubic centimeters per gram (cm³/g) and an average pore diameter of 9 nm or less.

2. The method of claim 1, wherein the calcining includes calcining the dry powder at a temperature of 650 to 850° C. for 1 to 5 hours (h).

3. The method of claim 1, wherein the zinc oxide nanoparticles have an average particle diameter of 100 am or less.

4. The method of claim 1, wherein the zinc precursor is at least one selected from the group consisting of zinc nitrate hydrate, a zinc chloride hydrate, a zinc sulfate hydrate, and a zinc acetate hydrate.

5. The method of claim 1, wherein the zinc precursor is zinc nitrate hexahydrate ($Zn(NO_3)_2 \cdot 6H_2O$).

6. The method of claim 1, wherein the zinc oxide nanoparticles have an average particle diameter of 85 nm or less.

7. The method of claim 1, wherein the mesopores have a total pore volume of 0.25 to 0.3 $cm^3/g$.

8. The method of claim 1, wherein the mesopores have a total pore volume of 0.2732 $cm^3/g$.

9. The method of claim 1, wherein the calcining comprises calcining the dry powder at a temperature of 650° C. for 3 h.

10. The method of claim 1, wherein the mesopores have an average pore diameter of 8.23 nm.

11. The method of claim 1, wherein the heating comprises heating the reaction mixture to a temperature of 120° C. to obtain the dry powder.

12. The method of claim 1, wherein the zinc oxide nanoparticles have an average crystallite size of 50 to 70 nm.

13. The method of claim 1, wherein the zinc oxide nanoparticles have an average crystallite size of 57.80 nm.

14. The method of claim 1, wherein the zinc oxide nanoparticles have a BET surface area of 70 $m^2/g$ or less.

15. The method of claim 1, wherein the zinc oxide nanoparticles have a BET surface area of 67.25 $m^2/g$.

16. The method of claim 1, wherein the reaction mixture has a weight ratio of L-tryptophan to zinc precursor of 1:1 to 1:10.

17. The method of claim 1, wherein the reaction mixture has a weight ratio of L-tryptophan to zinc precursor of 1:7 to 1:8.

18. The method of claim 1, wherein the zinc oxide nanoparticles have an average particle diameter of 82.93 nm.

19. The method of claim 1, further comprising:
forming a layer of the zinc oxide nanoparticles on a substrate or a semiconductor.

20. The method of claim 1, wherein the calcining of the dry powder is performed at a heating rate of from 1° C. to 15° C. per minute.

* * * * *